(12) United States Patent
Hellgren et al.

(10) Patent No.: US 6,439,018 B1
(45) Date of Patent: Aug. 27, 2002

(54) DEVICE AND METHOD FOR EXPANSION FORMING

(75) Inventors: Keijo Hellgren; Lennart Svensson, both of Västerås (SE)

(73) Assignee: Flow Holdings GmbH (SAGL) LLC (CH)

( * ) Notice: Subject to any disclaimer, the term of this patent is extended or adjusted under 35 U.S.C. 154(b) by 0 days.

(21) Appl. No.: 09/719,196

(22) PCT Filed: Jun. 21, 1999

(86) PCT No.: PCT/SE99/01117
§ 371 (c)(1),
(2), (4) Date: Feb. 23, 2001

(87) PCT Pub. No.: WO00/00309
PCT Pub. Date: Jan. 6, 2000

(30) Foreign Application Priority Data

Jun. 26, 1998 (SE) .................................... 9802272

(51) Int. Cl.⁷ ................................................ B21D 26/02
(52) U.S. Cl. ................... 72/58; 72/61; 72/62; 72/55
(58) Field of Search ............................... 72/58, 61, 62, 72/55

(56) References Cited

U.S. PATENT DOCUMENTS

| | | | |
|---|---|---|---|
| 2,688,297 A | * 9/1954 | Livermont et al. ............ | 72/58 |
| 2,696,184 A | 12/1954 | Demarest | |
| 3,120,205 A | 2/1964 | Pfeiffer et al. | |
| 4,580,427 A | * 4/1986 | Akamatsu ....................... | 72/62 |
| 4,751,835 A | 6/1988 | Galaniuk et al. ............... | 72/62 |
| 5,419,171 A | * 5/1995 | Bumgarner ..................... | 72/62 |
| 5,505,068 A | 4/1996 | Bartels ............................ | 72/62 |
| 5,644,829 A | * 7/1997 | Mason et al. ................... | 72/61 |
| 5,671,629 A | 9/1997 | Valyi ............................... | 72/58 |
| 5,823,031 A | * 10/1998 | Campbell et al. ............... | 72/58 |
| 5,884,516 A | * 3/1999 | Tseng .............................. | 72/58 |
| 6,088,902 A | * 7/2000 | Summers ........................ | 72/58 |

FOREIGN PATENT DOCUMENTS

| | | |
|---|---|---|
| DE | 43 09 932 A1 | 9/1994 |
| DE | 195 33 828 A1 | 3/1997 |
| JP | 6142792 | 5/1994 |
| JP | 9225545 | 9/1997 |
| JP | 10277657 | 10/1998 |

* cited by examiner

*Primary Examiner*—David Jones
(74) *Attorney, Agent, or Firm*—Seed Intellectual Property Law Group PLLC

(57) ABSTRACT

A device and method for expansion forming of an article used in conjunction with an isostatic press comprising a pressure cell equipped with an elastomeric membrane. The expansion forming tool has at least one pressure intensifier and at least one molding cavity. A blank is arranged in the molding cavity and an elastomeric forming body is arranged inside the blank. The pressure intensifier is arranged such that it is acted upon by the elastomeric membrane and it exerts pressure on the elastomeric forming body inside the blank inside the molding cavity so that the blank is expanded into an article shaped according to the shape of the molding cavity.

11 Claims, 3 Drawing Sheets

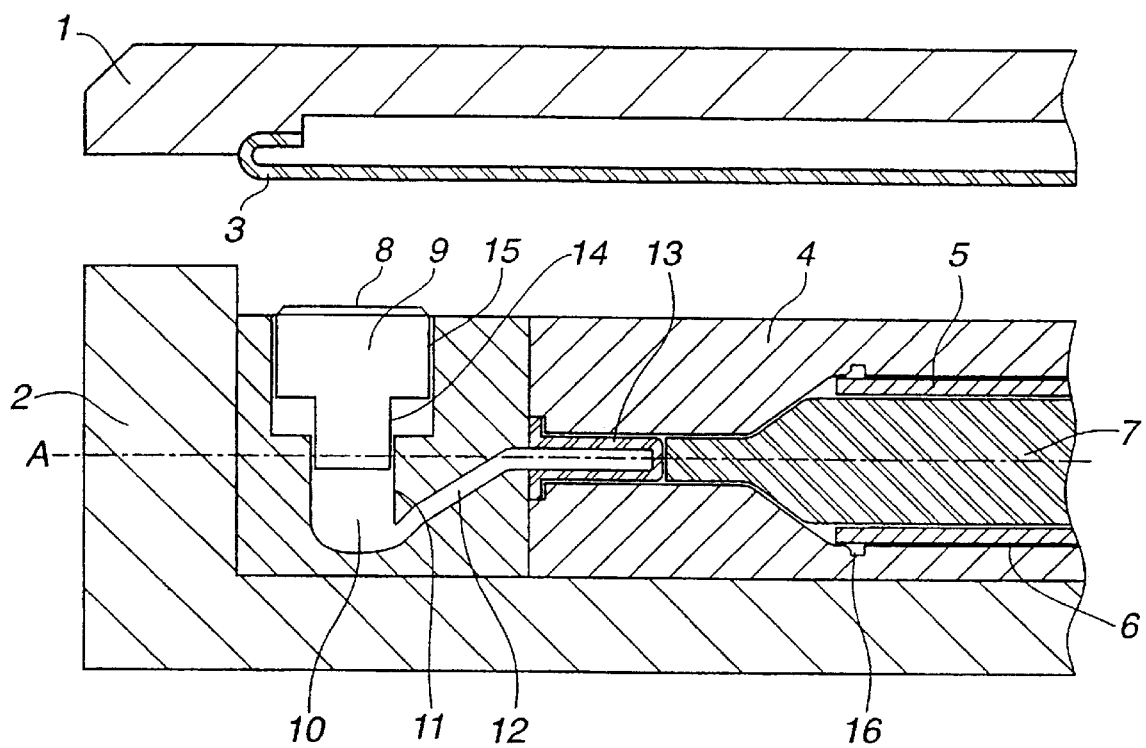

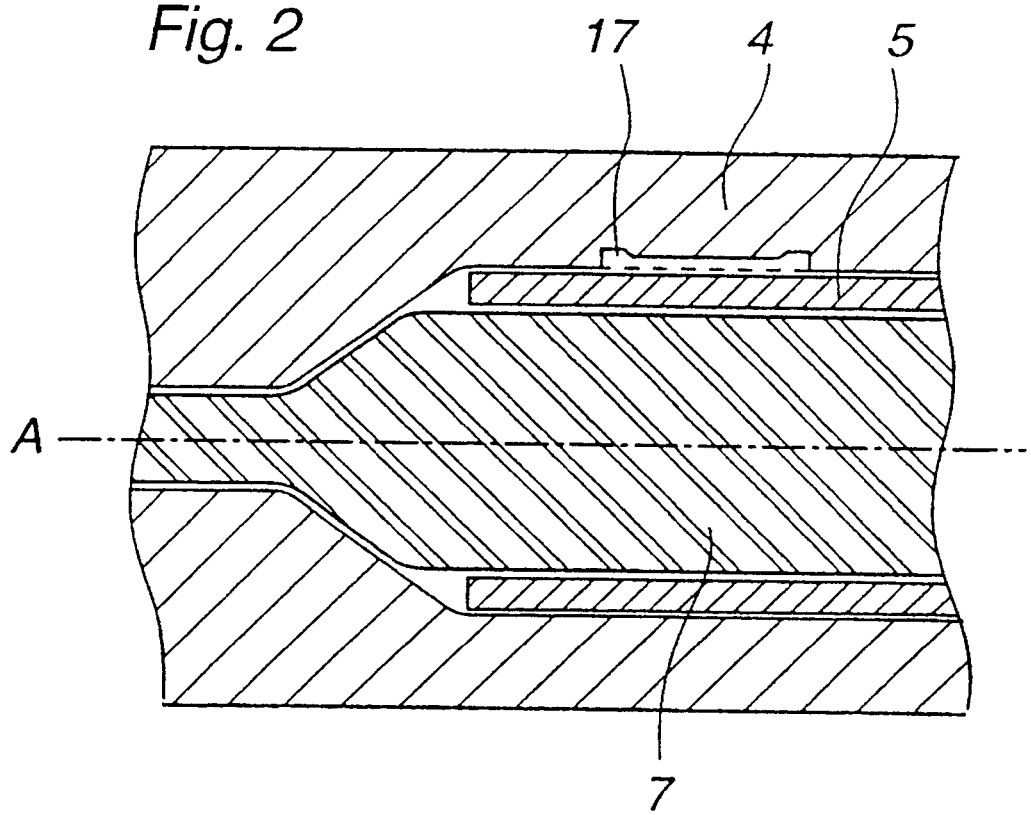
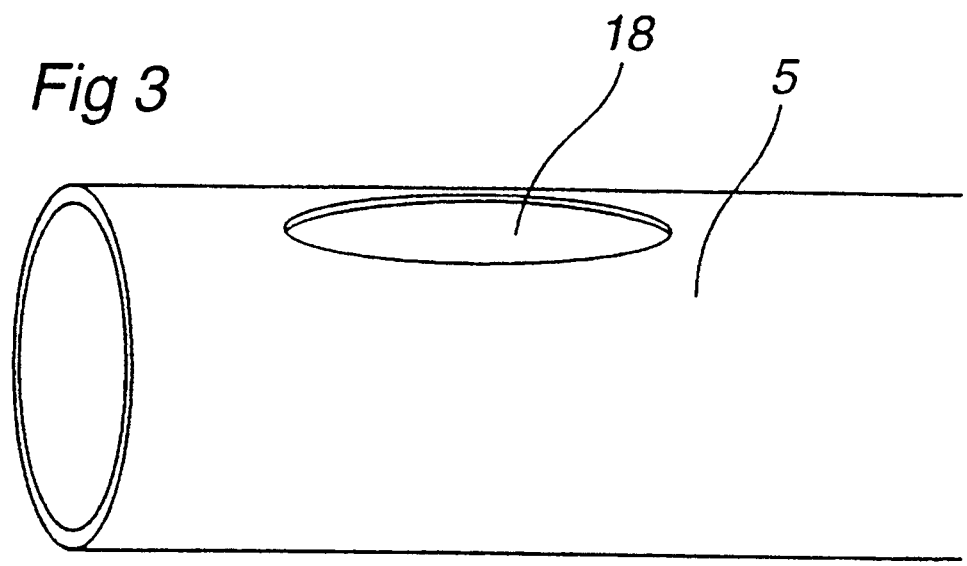

DEVICE AND METHOD FOR EXPANSION FORMING

BACKGROUND OF THE INVENTION

1. Field of the Invention

The present invention relates to a device and method for forming hollow articles. More precisely the present invention refers to expansion forming hollow and complex-shaped metal articles by means of high pressure.

2. Description of the Related Art

In the production of hollow articles there are well known methods to force a hollow or tubular blank against the walls of a surrounding cavity using a fluid pressure, for example a pressurized fluid such as hydraulic oil. U.S. Pat. No. 5,644,829, entitled "Method for Expansion Forming of Tubing," discloses a method for expanding a tube-shaped blank against the walls of a surrounding cavity. The method includes the use of two axial cylinders to seal the ends of the tube. The tube is then filled with a fluid, which is then pressurized. The pressure from the pressurized fluid forces the tube against the walls of the surrounding cavity. U.S. Pat. No. 5,419,171, entitled "Isostatic Bulge Forming," discloses a method for bulge-forming a tube-shaped blank using a pressure fluid in an isostatic press. It also discloses how a bulge or protrusion may be formed in a wall of the tube-shaped blank, a bulge that could be subsequently knocked out, thus forming an opening in the wall of the blank.

In an article entitled "HYDROFORMING APPLICATION IN THE AUTOMOTIVE INDUSTRY" published in the periodical "Advanced Technologies and Processes", the author discusses hydroforming. In particular hydroforming is discussed in relation to methods for forming hollow components such as parts of exhaust systems for automobiles. In the process described, a mold is held in a conventional two directional press. The mold also comprises two axial cylinders, which seal the open ends of a pipe-shaped blank. Steps in the process are disclosed, including the following:

A pipe blank is loaded into the cavity of the tool, the press closes the tool, axial cylinders seal the pipe ends and fill-in a liquid, which is pressurized. In the article a multiple fitting tool for multi-cavity production is also shown. This comprises a multi-cavity mold held in a horizontal molding press with internal pressure supplied to the cavities by a pressure intensifier via a pressurized liquid. The presses used in the hydroforming processes described supply internal pressure against the blank via a pressurized liquid.

A brochure issued by "KRUPP HOESCH AUTOMOTIVE GmbH" describes how a hydroforming process may be used to manufacture certain products such as chassis sub-frames and floor pans for the automotive industry. The process is described as comprising a press in which is mounted a mold or a tool. A tube-shaped blank or a specially contoured blank is placed in the mold. The mold is closed and in the case of the tube shaped blank, the ends are sealed with axial punches. By means of internal pressure supplied by a hydraulic fluid, as well as axial pressure in the tube example, the article is molded against the walls of the mold cavity.

Conventional processes such as those described above have the disadvantage that the amount of pressure available that can be exerted on a blank by a conventional two-directional press is limited. The limits are in terms of both direction of application, usually limited to one axis, and limited in magnitude of pressure, which can be applied. This means that pressure may be uniformly applied via a hydraulic fluid to the blank in the interior of the cavity, but the principal closing pressure applied to the exterior of the mold will be in one axial direction. This in turn means the internal pressure available in the mold is limited by the strength of the mold, and that the molding tools must be large enough and strong enough to withstand any tensile stresses produced by the internal pressure. The contact between the pressure fluid and the blank results in a requirement for seals within the mold that resist liquids under high pressure, and requires extra stages in the molding cycle to clean the blank before and after the process.

The use of a pressure fluid inside a blank makes the use of trimming edges or piercing forms inside a mold cavity difficult or impractical, so that trimming or piercing operations require additional process steps.

High pressures are required for at least two reasons. The first is to reduce the degree of spring back, which occurs. When subjected to low pressures, metal blanks typically deform elastically, which means that after the pressure is removed, the metal returns in part to its original shape. Permanent changes in the shape of metal blanks are the result of plastic deformation, which occurs at pressures greater than those that produce elastic deformation. Secondly, most of the metals used exhibit beneficially increased strength characteristics after they have been deformed plastically. This effect is sometimes described as cold working. Thus, using high or extremely high pressures can produce a finished shape, which is more accurate, which is closer to the required shape, and is a stronger product.

In the use of a high-pressure press such as an isostatic press of the Quintus® type, manufactured by Flow Pressure Systems in Sweden, there exists a difficulty in providing molds and molding devices that are sufficiently strong.

Molds and molding devices are often required to withstand very high pressures of up to 10,000 bar during each molding cycle in an isostatic press. Such molding devices are often very large, heavy and expensive.

SUMMARY OF THE INVENTION

The object of the invention is to provide a device and method for the expansion forming of an article according to the claims. A further object of the invention is to provide a device and method where the edges of the article may be trimmed by means of the expansion forming method. A still further object of the invention is a device and method with which an opening may be pierced in an article during the expansion forming. A yet still further object is, amongst others, that the expansion forming device be inexpensive to produce and economic to use.

These and other objects are achieved according to the invention by an expansion forming tool used with an isostatic press equipped with a membrane as described in the claims. The expansion forming tool is designed to produce extremely high pressures inside a hollow or tubular blank and shape the blank into an article by expansion against the walls of a molding cavity.

The expansion forming tool is designed so that the membrane of the isostatic press acts not only on the expansion forming tool, but also on one or more built-in pressure intensifiers. The pressure intensifiers increase the pressure received from the membrane and transfers it to a metal blank inside a molding cavity. This is carried out in the following way.

Pressure from the membrane influences the pressure intensifier piston and is increased in proportion to the relative diameters of the pressure intensifier piston. The pressure fluid in the channel transfers the increased pressure via a tube-shaped membrane and exerts it against an elastomeric forming body, typically made of rubber. The elastomeric forming body is positioned inside the metal blank, which is to be formed into the required hollow shape.

Under the pressure applied by the elastomeric forming body the blank is expanded and forced against the walls of the molding cavity in the expansion forming tool. Thus the blank takes the shape of the cavity walls.

The molding cavity walls can also be arranged with trimming edges and/or piercing forms. In this way, excess parts of the blank may be trimmed off during the expansion forming process by the pressure applied by the elastomeric forming body, forcing the blank against the trimming edges. Similarly one or more openings may be pierced through the walls of the blank by the pressure applied by the elastomeric forming body, forcing the blank against a suitably shaped piercing form.

Although the pressure on the blank may be extremely high, the expansion forming tool is arranged to use compression forces only. This means that the expansion forming tool may be relatively small and light in construction in relation to the pressures employed.

The pressure produced by the pressure intensifier depends on a ratio of diameters of a piston in the pressure intensifier. The relative diameters may be varied and selected to suit the characteristics of the blank to be formed. The expansion forming tool is not limited to a single molding cavity, and may comprise several molding cavities and pressure intensifiers.

A tubular shaped blank is used and shaped by expansion with the present invention into a hollow form. It is also within the scope of the invention to use a blank, which only partially encircles the elastomeric forming body.

The advantages of the invention over the known prior art are many. The expansion forming tool is small, light and relatively inexpensive to produce, which means in turn that relatively low production volumes become more economic. The forming pressure inside the blank may be greater than the closing pressure of the press. There is no contact between pressure fluids and the metal blanks, thereby avoiding sealing, cleaning and contamination problems. A blank may be trimmed and/or pierced during the expansion forming process by trimming edges and/or piercing forms included in the walls of the molding cavity for that purpose. Expansion forming in accordance with the present invention thus reduces the number of process steps necessary for shaping an article.

The availability of extremely high molding pressures compared to devices of the prior art means that more detailed shapes can be achieved in a single molding step. Greater plastic deformation of a blank is available, which results in more cold working and thus products with greater strength. It also means that high strength alloys and thicker gauge metals can be shaped economically. Higher strength achieved in the forming of the product also offers the opportunity to reduce the weight of material used in the article, which is important in applications such as parts for automobiles.

BRIEF DESCRIPTION OF THE DRAWINGS

The present invention will be described in more detail in connection with the enclosed drawings.

FIG. 1 shows schematically a device for expansion forming according to the invention.

FIG. 2 shows a piercing form in an expansion forming device according to the invention.

FIG. 3 shows an article with an opening pierced in it according to the invention.

DETAILED DESCRIPTION OF THE INVENTION

Figure 4:
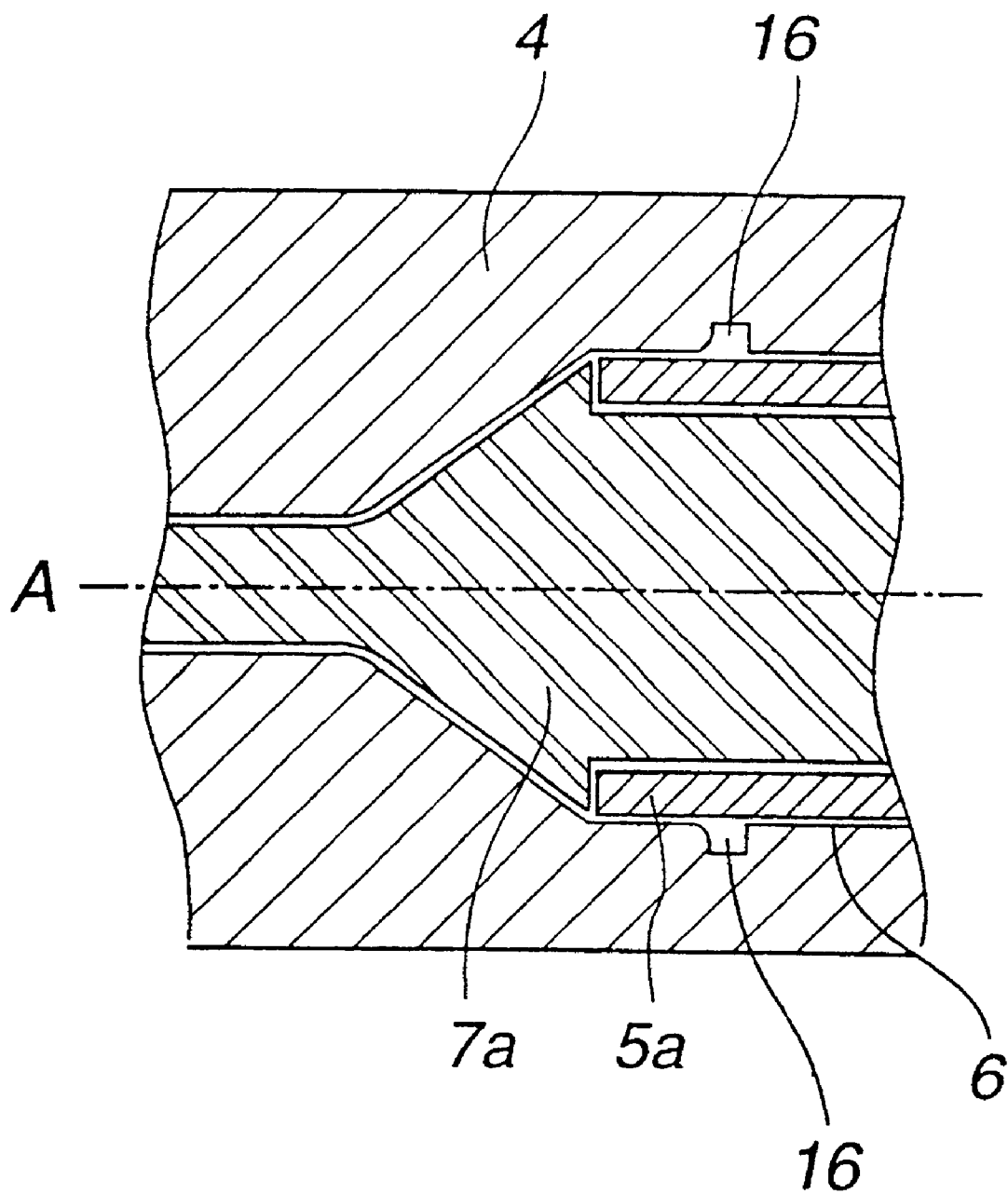
FIG. 4 shows schematically a development of an expansion forming device according to the invention.

FIG. 1 shows schematically an isostatic press, which comprises a pressure cell. The isostatic press comprises an upper, moveable part 1 and a lower, static part 2. In the upper, moveable part 1 of the isostatic press a membrane 3 is arranged with means available to supply pressurized fluid to it. An expansion forming tool 4 is situated in the lower, static part 2 of the isostatic press. The expansion forming tool 4 comprises a molding cavity 6 and may comprise more than one molding cavity. The expansion forming tool 4 is separable into, for example, two parts about a plane surface corresponding to the center line A through the molding cavity 6 as shown in FIG. 1.

An expansion forming method is as follows. A tubular or hollow blank 5 is placed in a lower part of the molding cavity 6 of the expansion forming tool 4. An elastomeric forming body 7 is placed inside the blank 5. The upper part of the molding cavity 6 is placed on top of the lower part so enclosing blank 5 with the elastomeric forming body 7 inside it. The press is closed, bringing the membrane 3 in the upper part of the isostatic press in contact with the expansion forming tool 4.

Pressure is developed in the upper part 1 of the press, applying a pressure against the membrane 3 and thus over the expansion forming tool 4. The expansion forming tool 4 comprises one or more pressure intensifiers 8 each of which contains a piston 9. The piston 9 is acted upon by the membrane 3 and exerts a pressure on a fluid 10 in a cylinder 11 inside the pressure intensifier 8. The pressure in the fluid is transferred via a channel 12 via a tube-shaped membrane 13 to the elastomeric forming body 7 inside the blank 5 in the molding cavity 6. The elastomeric forming body 7 expands and exerts a pressure against the blank 5 forcing it against the walls of the molding cavity 6. The blank 5 is thereby expanded into an article shaped according to the shape of the walls of the molding cavity 6.

The molding cavity may also be shaped such that excess parts of the blank are trimmed off by trimming edges 16 shown in FIGS. 1 and 4. In a further development of the embodiment shown in FIG. 2 one or more piercing forms 17 are included. During the expansion forming method, the blank 5 is forced against the piercing form 17 and a passageway or opening 18 is pierced through the wall of blank 5 as shown in FIG. 3.

Upon the completion of the expansion forming method pressure is removed. The upper part 1 of the press is raised, and the expansion forming tool 4 separated by, for example removing an upper part containing an upper part of the molding cavity 6. The blank 5, which has now become a shaped article, is removed from the molding cavity 6. Trimmed off or scrap material is removed from the trimming edge 16. Scrap material from a piercing operation is removed from the piercing form 17.

The trimming edge 16 shown in FIG. 1 is in the form of a circumferential groove in the walls of the molding cavity 6. It is within the scope of the invention that the expansion forming tool may also comprise trimming edges and/or piercing forms that protrude from the surrounding walls of the cavity and into the cavity. Such trimming edges and/or piercing forms include both static devices fixed in the cavity walls and moveable devices that may be moved out from the walls of the cavity into walls of the blank using pressure intensifiers or other hydraulic or mechanical means.

The pressure increase achieved by the pressure intensifier is determined by the selection of a diameter of the upper part 15 of the piston 9 in the pressure intensifier 8 relative to a diameter of the lower part 14 of the piston 9.

The elastomeric forming body 7 may be shaped so as to fit closely with blanks of different shapes, which are used to produce finished articles of different shapes. For example, FIG. 4 shows a blank 5a that has a relatively thick wall thickness, which may be used together with an elastomeric forming body 7a, which has a corresponding change in cross section. To ensure a close fit between the elastomeric forming body and blanks with different shapes and/or blanks with an undercut, the elastomeric forming body 7, 7a may also consist of more than one piece.

An alternative method of placing the elastomeric forming body 7 inside the blank 5 is as follows. An elastomeric forming body 7 for an elongated tube-shaped blank 5 may be greater in diameter than the diameter of the tube-shaped blank 5 before expansion forming. In this case, the elastic forming body 7 may be stretched longitudinally and the tube shaped blank 5 slipped over the stretched elastomeric body 7. The tube shaped blank 5 together with the elastomeric forming body 7 already inserted may then be inserted in the molding cavity 6 of the expansion forming tool 4. From the foregoing it will be appreciated that, although specific embodiments of the invention have been described herein for purposes of illustration, various modifications may be made without deviating from the spirit and scope of the invention. For example, it will be understood that the various components and steps of the systems described above may be used in various combinations with each other. Accordingly, the invention is not limited except as by the appended claims.

What is claimed is:

1. A device for expansion forming of an article, used in conjunction with an isostatic press, comprising:

a pressure cell provided with an elastomeric membrane, and with an expansion forming tool, the expansion forming tool having at least one pressure intensifier and at least one molding cavity, a blank and an elastomeric forming body provided inside the blank being positioned in the molding cavity, wherein the pressure intensifier is arranged such that it is acted upon by the elastomeric membrane, and the pressure intensifier is arranged to exert pressure on the elastomeric forming body such that the elastomeric forming body forces the blank against walls of the molding cavity and the blank is expanded into an article substantially shaped according to a shape of the molding cavity.

2. A device according to claim 1, wherein the pressure intensifier comprises a piston arranged in a cylinder, the cylinder containing a pressure fluid connected via a channel to a second membrane, the second membrane being arranged to contact the elastomeric forming body arranged inside the blank.

3. A device according to claims 1 or 2, wherein a diameter of an upper part of a piston in the pressure intensifier is greater than a diameter of a lower part of the piston.

4. A device according to claim 1, wherein the molding cavity is provided with one or more trimming edges to trim off excess parts of the blank.

5. A device according to claim 1, wherein the molding cavity is provided with one or more piercing forms in the walls of the molding cavity to pierce one or more openings in the walls of the blank.

6. A method for expansion forming an article in an isostatic press, comprising:

placing a blank inside a molding cavity of an expansion forming tool provided in the isostatic press;

placing an elastomeric forming body inside the blank;

directing pressure in the isostatic press against an elastomeric membrane which is in contact with at least one pressure intensifier arranged in the expansion forming tool;

exerting pressure by means of the pressure intensifier against the elastomeric forming body inside the blank; and forcing the blank against walls of the molding cavity and forming the blank by expansion into an article that is substantially shaped according to the shape of the molding cavity.

7. A method for expansion forming an article according to claim 6, in which the step of placing the elastomeric forming body inside the blank is further comprises:

stretching the elastomeric forming body longitudinally; and slipping the blank over the elastomeric forming body.

8. A method for expansion forming an article according to claim 6, further comprising:

trimming the blank via one or more trimming edges provided in the molding cavity.

9. A method for expansion forming an article according to claim 6, further comprising:

piercing one or more openings in the blank via one or more piercing forms provided in the molding cavity.

10. A device for expansion forming of an article, used in conjunction with an isostatic press, comprising:

a pressure cell provided with an elastomeric membrane and with an expansion forming tool, the expansion forming tool having at least one molding cavity, a blank and an elastomeric forming body provided inside the blank being positioned in the molding cavity, wherein the expansion forming tool is arranged such that it is acted upon by the elastomeric membrane to in turn exert pressure on the elastomeric forming body, the elastomeric forming body forcing the blank against walls of the molding cavity to expand the blank into an article substantially shaped according to the shape of the molding cavity.

11. A method for expansion forming an article in an isostatic press, comprising:

placing a blank inside a molding cavity of an expansion forming tool provided in the isostatic press;

placing an elastomeric forming body inside the blank;

directing pressure in the isostatic press against an elastomeric membrane which is in contact with the expansion forming tool;

exerting pressure by means of the expansion forming tool against the elastomeric forming body inside the blank; and forcing the blank against walls of the molding cavity and forming the blank by expansion into an article that is substantially shaped according to the shape of the molding cavity.

* * * * *